(12) United States Patent
Lupton

(10) Patent No.: US 7,582,474 B2
(45) Date of Patent: Sep. 1, 2009

(54) PROCESS REACTOR WITH LAYERED PACKED BED

(75) Inventor: Francis S. Lupton, Evanston, IL (US)

(73) Assignee: Honeywell International Inc., Morristown, NJ (US)

( * ) Notice: Subject to any disclaimer, the term of this patent is extended or adjusted under 35 U.S.C. 154(b) by 160 days.

(21) Appl. No.: 11/481,765

(22) Filed: Jul. 6, 2006

(65) Prior Publication Data
US 2007/0007201 A1  Jan. 11, 2007

Related U.S. Application Data

(60) Provisional application No. 60/698,106, filed on Jul. 11, 2005.

(51) Int. Cl.
C12M 1/14 (2006.01)

(52) U.S. Cl. .................. 435/293.1; 435/299.1; 422/211; 422/221; 422/310; 422/311; 210/616; 210/263; 210/150

(58) Field of Classification Search .................. 422/211, 422/221, 310, 311; 261/94, 95, DIG. 72; 210/616, 263, 150; 435/299.1, 293.1
See application file for complete search history.

(56) References Cited

U.S. PATENT DOCUMENTS

| | | | |
|---|---|---|---|
| 3,617,531 A | | 11/1971 | Schlicht et al. |
| 4,002,705 A | * | 1/1977 | McKeown ............... 261/98 |
| 4,005,985 A | * | 2/1977 | Hutson, Jr. ............... 422/217 |
| 4,165,281 A | | 8/1979 | Kuriyama et al. |
| 4,469,600 A | | 9/1984 | Frydman et al. |
| 4,561,974 A | | 12/1985 | Bernard et al. |
| 4,576,718 A | | 3/1986 | Reischl et al. |
| 4,615,796 A | * | 10/1986 | Kramer ............... 208/146 |
| 4,634,672 A | | 1/1987 | Baumgarten et al. |
| 4,681,852 A | | 7/1987 | Tribe |
| 4,820,415 A | | 4/1989 | Reischl |
| 4,904,456 A | * | 2/1990 | Anderson ............... 422/220 |
| 4,983,299 A | | 1/1991 | Lupton et al. |
| 5,143,714 A | | 9/1992 | Cosgrove et al. |
| 5,217,616 A | * | 6/1993 | Sanyal et al. ............... 210/617 |
| 5,242,626 A | * | 9/1993 | Oshima ............... 261/94 |
| 5,338,518 A | * | 8/1994 | Marion et al. ............... 422/211 |
| 5,503,738 A | * | 4/1996 | DeFilippi et al. ............... 210/150 |

(Continued)

FOREIGN PATENT DOCUMENTS

EP 0116497 A1 8/1984

(Continued)

Primary Examiner—N. Bhat
(74) Attorney, Agent, or Firm—Ingrassia, Fisher & Lorenz, P.C.

(57) ABSTRACT

Packed bed reactors that have a series of alternating layers of packing. A first packing layer has open body packing elements randomly packed in a layer up to about 10 packing elements deep; and a second packing layer has porous support elements of hydrophobic foam. The porous support elements are randomly packed up to about 10 porous support elements deep. Further, the packing elements of the first layer include substantially cylindrical shapes and the porous support elements of the second layer include substantially rectilinear shapes. In some embodiments, the second layer supports microbial organisms in a biological reactor, and the first layer of open body packing provides fluid flow spaces to facilitate fluid flow and distribution, mass transfer, and to minimize channeling.

20 Claims, 6 Drawing Sheets

U.S. PATENT DOCUMENTS

| | | | |
|---|---|---|---|
| 5,543,052 A * | 8/1996 | Lupton et al. | 210/616 |
| 5,580,770 A | 12/1996 | DeFilippi | |
| 5,690,819 A * | 11/1997 | Chianh | 210/150 |
| 5,747,143 A * | 5/1998 | Niknafs | 428/174 |
| 5,800,709 A | 9/1998 | Smith | |
| 6,291,603 B1 * | 9/2001 | Glover | 526/71 |
| 6,395,522 B1 | 5/2002 | DeFilippi et al. | |
| 6,425,574 B1 * | 7/2002 | Sunder | 261/94 |
| 6,524,849 B1 * | 2/2003 | Adams et al. | 435/299.1 |
| 6,547,222 B2 * | 4/2003 | Blischak et al. | 261/94 |
| 6,666,436 B1 * | 12/2003 | Lerner | 261/95 |
| 6,890,433 B2 * | 5/2005 | Nurse et al. | 210/263 |
| 6,936,446 B2 * | 8/2005 | Kallenbach et al. | 435/180 |
| 2002/0068026 A1 * | 6/2002 | Murrell et al. | 422/211 |

FOREIGN PATENT DOCUMENTS

| | | | |
|---|---|---|---|
| FR | 2689494 | * | 10/1993 |
| GB | 1412590 | * | 11/1975 |
| JP | 55145589 A | | 11/1980 |
| NL | 1018703 C2 | | 2/2003 |

* cited by examiner

PROCESS REACTOR WITH LAYERED PACKED BED

CROSS-REFERENCE TO RELATED APPLICATION(S)

This application claims the benefit of priority from U.S. provisional patent application Ser. No. 60/698,106, filed Jul. 11, 2005.

TECHNICAL FIELD

The present invention relates generally to reactors. More particularly, the present invention relates to packed bed reactors suitable for use in chemical and biological processes.

BACKGROUND

Packed reactors are commonly used in the chemical, pharmaceutical, waste treatment, and fermentation industries for a variety of processes. In general, packing provides an increase in surface area inside the reactor, based on the surface area to volume ratio of the particular packing selected. Generally, the surface area of the packing provides a surface onto which reaction promoters such as microbes may attach in biological reactors, or onto which reaction promoters such as chemical catalysts may be attached in chemical reactors. Since the reaction process whether biological or chemical is generally dependent upon reactant contact and time of contact with the reaction promoter, providing larger surface areas with the reaction promoter within a reactor volume may facilitate reactor size reduction leading to cost savings. Accordingly, the larger the surface area to volume ratio, the smaller volume of reactor is necessary for a particular process.

Commercially available packing varies widely in shape and may include elements to increase the surface area. For example, a cylindrical packing material may have an axial through bore, to provide both inner and outer surfaces to increase the surface area to volume ratio. In addition, the cylindrical packing may include inner and/or outer ribs or other structure to further increase effective surface area.

Referring for example more specifically to biological reactors used in waste treatment, the pollutants serve as a food source, generally as a source of carbon and/or nitrogen, for microorganisms on the reactor packing. Bacterial metabolism converts the pollutants to metabolites generally with a simple chemical structure, sometimes degrading the pollutants completely to carbon dioxide and water in an aerobic process, or to methane in an anaerobic process. But in any event, the metabolites usually have no adverse environmental effects.

Various bioremediation processes are known. For example, U.S. Pat. No. 4,634,672 describes biologically active compositions for purifying waste water and air which comprises a polyurethane hydrogel containing surface active coal having a specific surface according to BET of above 50 m.sup.2/g, a polymer having cationic groups and cells having enzymatic activity and being capable of growth. U.S. Pat. No. 4,681,852 describes a process for biological purification of waste water and/or air by contacting the water or air with the biologically active composition of U.S. Pat. No. 4,634,672. The experimental examples of these patents indicate that the process is not effective for reducing contaminant concentrations in the effluent strain to less than 44 parts per million (ppm). This is not acceptable since the Environmental Protection Agency (EPA) in some instances has mandated that concentration for some contaminants (such as phenol) in the effluent stream must be as low as 20 parts-per-billion (ppb). (See Environmental Protection Agency 40 CFR Parts 414 and 416. Organic Chemicals and Plastics and Synthetic Fibers Category Effluent Limitations Guidelines, Pretreatment Standards, and New Source Performance Standards. Federal Register, Vol. 52, No. 214, Thursday, Nov. 5, 1989. Rules & Regulations, 42522.

Both U.S. Pat. Nos. 3,904,518 and 4,069,148 describe the addition of activated carbon or Fuller's earth to a suspension of biologically active solids (activated sludge) in waste water as an aid in phenol removal. The absorbents presumably act by preventing pollutants toxic to the bacteria from interfering with bacterial metabolic activity. The patentees' approach has matured into the so-called PACT process which has gained commercial acceptance despite its requisites of a long residence time, copious sludge formation with attendant sludge disposal problems, and the need to regenerate and replace spent carbon.

Rehm and coworkers have further refined the use of activated carbon in the aerobic oxidation of phenolic materials by using microorganisms immobilized on granular carbon as a porous biomass support system. Utilizing the propensity of microorganisms to grow on and remain attached to a surface, Rehm used a granular activated carbon support of high surface area (1300 m.sup.2/g) to which cells attached within its macropores and on its surface, as a porous biomass support system in a loop reactor for phenol removal. H. M. Ehrhardt and H. J. Rehm, Appl. Microbiol. Biotechnol., 21, 32-6 (1985). The resulting "immobilized" cells exhibited phenol tolerance up to a level in the feed of about 15 g/L, whereas free cells showed a tolerance not more than 1.5 g/L. It was postulated that the activated carbon operated like a "buffer and depot" in protecting the immobilized microorganisms by absorbing toxic phenol concentrations and setting low quantities of the absorbed phenol free for gradual biodegradation. This work was somewhat refined using a mixed culture immobilized on activated carbon [A. Morsen and H. J. Rehm, Appl. Microbiol. Biotechnol., 26, 283-8 (1987)] where the investigators noted that a considerable amount of microorganisms had "grown out" into the aqueous medium, i.e., there was substantial sludge formation in their system.

Suidan and coworkers have done considerable research on the analogous anaerobic degradation of phenol using a packed bed of microorganisms attached to granular carbon [Y. T. Wang, M. T. Suidan and B. E. Rittman, Journal Water Pollut. Control Fed., 58 227-33 (1986)]. For example, using granular activated carbon of 16.times.20 mesh as a support medium for microorganisms in an expanded bed configuration, and with feed containing from 358-1432 mg phenol/L, effluent phenol levels of about 0.06 mg/L (60 ppb) were obtained at a hydraulic residence time (HRT) of about 24 hours. Somewhat later, a berl-saddle-packed bed and expanded bed granular activated carbon anaerobic reactor in series were used to show a high conversion of COD to methane, virtually all of which occurred in the expanded bed reactor; P. Fox, M. T. Suidan, and J. T. Pfeffer, ibid., 60, 86-92, 1988. The refractory nature of ortho-cresols and meta-cresols toward degradation also was noted.

Givens and Sack, 42nd Purdue University Industrial Waste Conference Proceedings, pp. 93-102 (1987), performed an extensive evaluation of carbon impregnated polyurethane foam as a microbial support system for the aerobic removal of pollutants, including phenol. Porous polyurethane foam internally impregnated with activated carbon and having microorganisms attached externally was used in an activated sludge reactor, analogous to the Captor and Linpor processes which differ only in the absence of foam-entrapped carbon.

The process was attended by substantial sludge formation and without any beneficial effect of carbon.

The Captor process itself utilizes porous polyurethane foam pads to provide a large external surface for microbial growth in an aeration tank for biological waste water treatment. The work described above is the Captor process modified by the presence of carbon entrapped within the foam. A two-year pilot plant evaluation of the Captor process itself showed substantial sludge formation with significantly lower microbial density than had been claimed. J. A. Heidman, R. C. Brenner and H. J. Shah, J. of Environmental Engineering, 114, 1077-96 (1988). A point to be noted, as will be revisited below, is that the Captor process is essentially an aerated sludge reactor where the pads of sludge are retained in an aeration tank by screens in the effluent line. Excess sludge has to be continually removed by removing a portion of the pad via a conveyor and passing the pads through pressure rollers to squeeze out the solids.

H. Bettmann and H. J. Rehm, Appl. Microbial. Biotechnol., 22, 389-393 (1985) have employed a fluidized bed bioreactor for the successful continuous aerobic degradation of phenol at a hydraulic residence time of about 15 hours using *Pseudomonas putida* entrapped in a polyacrylamide-hydrazide gel. The use of microorganisms entrapped within polyurethane foams in aerobic oxidation of phenol in shake flasks also has been reported; A. M. Anselmo et al., Biotechnology B.L., 7, 889-894 (1985).

Known bioremediation processes suffer from a number of inherent disadvantages. For example, a major result of increased use of such processes is an ever increasing quantity of sludge, which presents a serious disposal problem because of increasingly restrictive policies on dumping or spreading untreated sludge on land and at sea. G. Michael Alsop and Richard A. Conroy, "Improved Thermal Sludge Conditioning by Treatment With Acids and Bases", Journal WPCF, Vol. 54, No. 2 (1982), T. Calcutt and R. Frost, "Sludge Processing—Chances for Tomorrow", Journal of the Institute of Water Pollution Control, Vol. 86, No. 2 (1987) and "The Municipal Waste Landfill Crisis and A Response of New Technology", Prepared by United States Building Corporation, P.O. Box 49704, Los Angles, Calif. 90049 (Nov. 22, 1988). The cost of sludge disposal today may be several times greater than the sum of other operating costs of waste water treatment.

Use of anaerobic sewage treatment systems has been offered as a solution to the sludge problem. William J. Jewell "Anaerobic Sewage Treatment", Environ. Sci. Technol., Vol. 21, No. 1 (1987). The largest difference between aerobic and anaerobic systems is in cellular yield. More than half of the substrate removal by aerobic systems can yield new microbial mass or sludge, the yield under anaerobic conditions is usually less that 15% of the organic substances removed. However, anaerobic systems are limited in the number of substrate that they can degrade or metabolize such as non-substituted aromatics (See N. S. Battersby & V. Wilson. "Survey of the anaerobic biodegradation Potential of Organic Chemicals in Digesting Sludge." Applied & Environmental Microbiology, 55(2):p. 433-439, February 1989. This is a significant disadvantage in that most industrial processes, such as coke production and coal tar processing, normally produces non-substituted aromatics as by-products (See J. M. Thomas, M. D. Lee, M. J. Scott and C. H. Ward, "Microbial Ecology of the Subsurface at an Abandoned Creosote Waste Site." Journal of Industrial Microbiology, Vol. 4, p. 109-120, 1989.

Another disadvantage inherent in some known bioremediation processes is that these processes do not reduce the levels of organic pollutants to reasonable levels [preferable less than about 0.1 parts per million (ppm)] at reasonable residence times (preferably less than about 24 hours). For example, in the process of U.S. Pat. Nos. 4,681,851 and 4,634,672 (see the specific examples), the concentration of phenol contaminants was not reduced below about 44 ppm.

U.S. Pat. No. 2,812,031 relates to the extraction of phenolic materials from aqueous solutions by means of polyurethane foam in the presence of hydrophilic fibers. The patent states that while polyurethane foams are relatively hydrophobic which can interfere with the interfacial contact which is necessary to permit adsorption, the problem is overcome through the use of hydrophilic fibers which enable the materials to come into close and in intimate contact with the surfaces of the polyurethane to facilitate wetting thereof.

U.S. Pat. No. 3,617,531 relates to a method for the selective adsorption of phenol from hydrocarbon solutions. In this method, the solution is contacted with polyurethane foam.

U.S. Pat. No. 4,983,299 and PCT WO 90/11970 describe fixed bed reactors for the bioremediation or organic contaminants where the reactor contains a biomass formed from particulates having a substrate such as polyurethane foam having anaerobic microbes and an absorbent for the pollutant on, in or on all in said substrate.

U.S. Pat. No. 4,165,281 discloses a method and a unit for wastewater treatment with microorganisms, in which at least one non-woven fibrous mat having a three-dimensional network structure is disposed as a supporting media in an aeration tank, microorganisms are retained on the surface of and in the interstices of the non-woven fibrous mat, and organic polluting matter in the wastewater is oxidatively decomposed by the microorganisms in the presence of oxygen.

U.S. Pat. No. 4,820,415 discloses a process for the biological treatment of an aqueous waste containing liquid by the removal of organic matter by microorganisms wherein a carrier material for said microorganisms is added to said liquid and wherein said carrier material comprises a filler-containing, hydrophilic, open-celled polymer in the form of separate individual particulates, the improvement wherein said polymer particulates, when saturated with water and charged with at least 70 volume % of biomass formed in the course of the process, have an average density of slightly below the density of said liquid and thereby are suspended in the upper two-thirds of said liquid.

U.S. Pat. No. 4,469,600 describes the biological purification of wastewater in a reactor in the presence of open-pore and compressible carrier material for biomass, the carrier material, prior to its use in the reactor, is loaded with bacteria, finely divided, inorganic and/or organic compounds, selected for wastewater purification, and is then either stored or used in the process, the loaded carrier being especially useful for decreasing the start-up time of a wastewater treatment plant.

U.S. Pat. No. 4,576,718 relates to the use of non-floating, non-abrasive, highly-filled polyurethane (urea) compositions of high water-absorbability, which during their production contain no cells capable of growth as carriers for biomass in the biological treatment of waste containing liquids. These carriers have a filler content of greater than 15% by weight and less than 95% by weight (based on the moisture-free). The fillers are selected from the group consisting of natural materials containing finely-divided fossil lignocellulose or the secondary products thereof (e.g., peat, lignite, mineral coal or coke), active carbon, finely-divided distillation residues, inorganic fillers, homogeneous or cellular plastics particulates (and more particularly polyurethane foam (waste) particulates) and mixtures thereof. The polyurethane (urea) is a hydrophilic and/or hydrophobic polyurethane (urea), and preferably contains cationic groups. These highly-filled, polyurethane (urea) carriers have a water-absorbability exceeding 33% by weight of water in the swollen carrier.

The prior art describes the superior properties of open cell polyurethane foam as a support matrix for biological active biomass but does not address the intrinsic problems associated with the use of this material in bioreactors. Mass transfer in fixed film bioreactors using polyurethane as a support matrix is limited by the structural integrity of the polyurethane foam to resist compression and thus by-passing of the fixed bed reactor by water and air as described in L. J. DeFilippi and F. Stephen Lupton, "Introduction to Microbial Degradation Of Aqueous Waste and its Application Using a Fixed-Film Reactor", Chapter 2, p. 35-68, in "Biological Treatment of Hazardous Wastes", ed. G. A. Lewandowski and L. J. DeFilippi, 1998. There have been a number of attempts to over come this inherent problem with polyurethane foam. One approach is to use polyurethane foam attached to rotating plates of a Rotating Biological Contactor (RBC) as described by Takahiro Suzuki, Satomi Yamaya and Masaru Ishida, "Treatment of Hydrocarbons in Air-Sparged Bioreactor and Rotating Biological Contactors", The Association for Environmental Health and Sciences, Soil Sediment and Water, August, 2001. However, these authors show that RBC's are not as effective bioreactors as air-sparged (bubble column) bioreactors.

U.S. Pat. No. 5,217,616 relates to the use of polyurethane foam randomly mixed with hard plastic spacers to prevent compression of the polyurethane during air-sparging of the bed. Although the polyurethane bed is not compressed the mass transfer of oxygen from the air bubbles to the liquid phase is lower than if the liquid phase was aerated without the presence of the packing material.

Accordingly, it is desirable to develop a packing for a reactor that provides an advantageous surface area to volume ratio, while maintaining low pressure drop characteristics and avoiding excessive channeling of fluid through the reactor so that a distribution of residence times within the reactor is within a relatively narrow range. In addition, it is desirable to utilize materials, such as polyurethane foams, that have potentially high surface area to volume ratio due to pores within the foam that are accessible to provide reaction surfaces. Furthermore, other desirable features and characteristics of the present invention will become apparent from the subsequent detailed description and the appended claims, taken in conjunction with the accompanying drawings and the foregoing technical field and background.

BRIEF SUMMARY

The invention provides a packed bed reactor suitable for a variety of applications in the chemical, pharmaceutical, waste reduction, fermentation and related industries. Embodiments of the packed beds are characterized by alternating layers of packing. The packed bed reactors provide low pressure drops through the beds, reduced channeling through the beds, and hence improved reactor residence time distribution. The improved residence time distribution has significant effects in terms of quality control of out flowing treated process streams, and in terms of potential reduction in reactor size and cost reductions.

The invention significantly ameliorates one of the major drawbacks of packed bed reactors, especially bioreactors that include a microbial organism therein, namely the problem of channeling in randomly packed beds. Channeling, or poor fluid flow distribution, arises because air and water tend to find channels of least resistance through the random packing elements and biomass. As a result, dissolved nutrients, oxygen and substrates are delivered preferentially to the zones adjacent to these developing channels while other portions of the bed are not as active in the biological processes. Further because growth of microorganisms is encouraged in zones adjacent to the channels, this further restricts the even distribution of these biochemical reactants throughout the randomly packed bed. The packed beds of the invention that have alternating layers of active bodies (porous supports for microorganisms) and open body packing elements provide a useful solution, as explained here below.

In one embodiment, the invention provides a reactor with a packed bed that has a series of alternating layers of packing. The alternating layers of packing include a first packing layer of open body packing elements; and a second packing layer of porous support elements comprising pores in the size range from about 15 to about 20 ppi.

In another embodiment, the invention provides a packed bed reactor with a series of alternating layers of packing where a first packing layer has open body packing elements randomly packed in a layer up to about 10 packing elements deep; and a second packing layer of porous support elements of hydrophobic foam. The foam has pores in the size range from about 15 to about 20 ppi and the porous support elements are randomly packed up to about 10 porous support elements deep. The packing elements of the first layer and the porous support elements of the second layer are selected by shape to maintain a reactor bed void space within the range from about 50 to about 65%.

In another embodiment, the packed bed reactor has a series of alternating layers of packing where a first packing layer has open body packing elements randomly packed in a layer up to about 10 packing elements deep; and a second packing layer has porous support elements of hydrophobic foam. The porous support elements are randomly packed up to about 10 porous support elements deep. Further, the packing elements of the first layer include substantially cylindrical shapes and the porous support elements of the second layer include substantially rectilinear shapes.

While the following detailed description relates primarily to use of the reactors in biological processes for waste water treatment, it is readily apparent to those of skill in the art that the reactors of the invention have broad application in other chemical and biological processing fields where the advantages of the invention will be useful.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
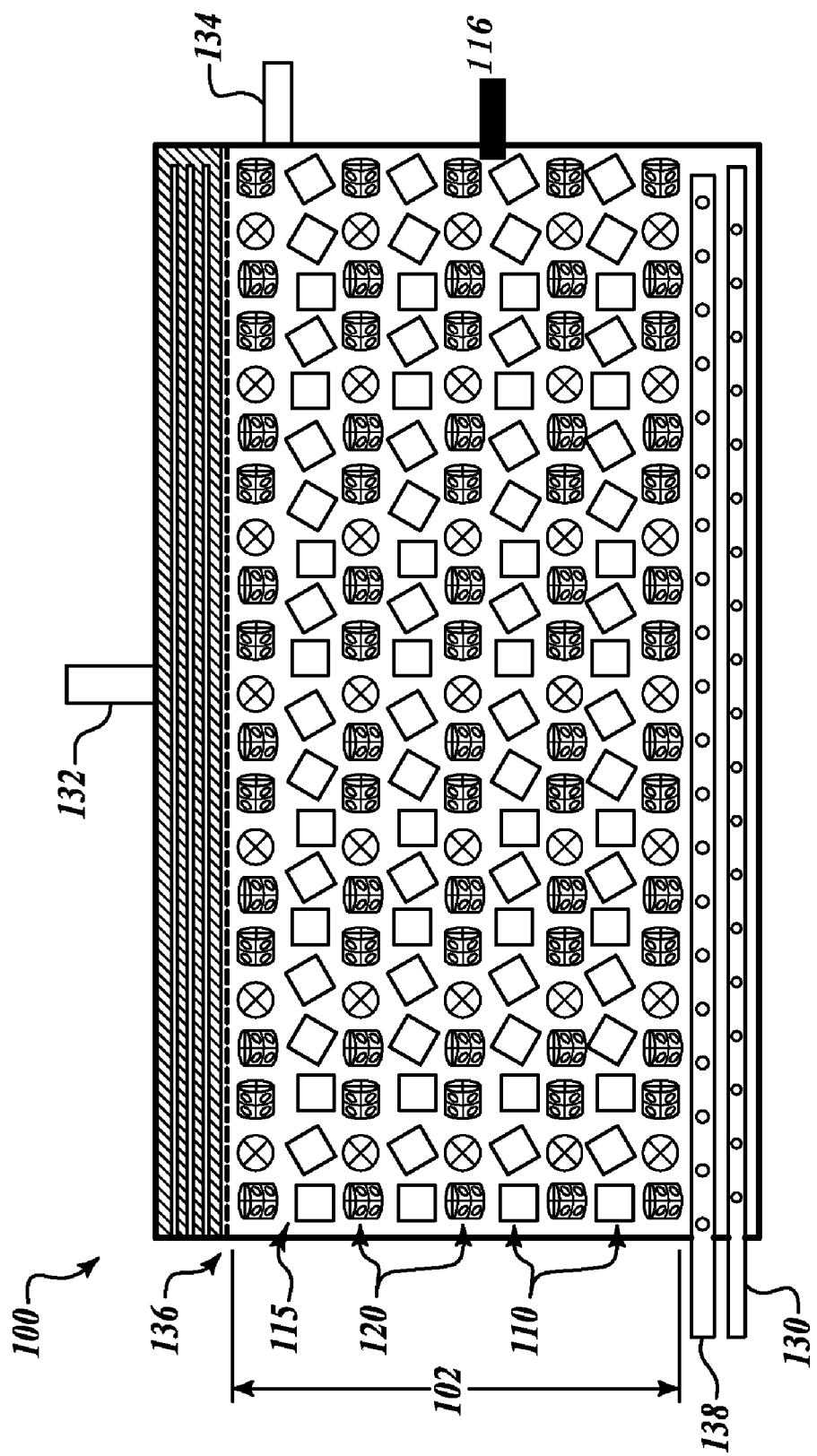
FIG. 1 is a schematic cross sectional view of an embodiment of a cylindrical packed bed reactor in accordance with the invention.

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention presents packed bed reactors with a series of alternating layers of packing that are useful in a variety of applications. For brevity and ease of description, much of the following will focus on waste water treatment, with the understanding that description of this aspect or field does not limit application of the invention to this aspect or field only.

In one aspect, this invention relates to a process for the removal of organic pollutants from waste water. More particularly, this aspect relates to a packed bed reactor and process for removal of such pollutants, especially priority pollutants and Chemical Oxygen Demand (COD), by aerobic biodegradation using a porous biomass support system. Of course, the removal of other contaminants such as biological oxygen demand (BOD) that are known to be removed by bioremediation are also within the scope of the invention.

As applied in waste water treatment, the process uses a reactor having an inlet for in-flow of a process feed stream containing one or more contaminant materials and an outlet for out-flow of an effluent stream in which the concentration of at least one of the contaminant materials is less than the concentration the feed stream. The reactor contains a biologically active biomass that effectively reduces one or more contaminants. The biomass is contained on a plurality of porous supports that together with the biomass constitute a plurality of biologically active bodies. The porous supports are distributed in the reactor with spaces between. Thus, in general, the biologically active bodies include a substrate (namely the porous supports) and an effective amount of one or more microorganisms capable of metabolizing at least one of the contaminant materials in the process feed stream under reactor process conditions. The biologically active bodies have a surface to volume ratio which is greater than that of the open body packing elements that is distributed in the biomass to allow contact between the process feed stream passing through the open body packing elements and all, or a portion, of the internal and external surfaces of all biologically active bodies adjacent to said spaces.

Additionally, this invention relates to the process, apparatus and biomass that provides for improved rate, efficiency and/or controllability of the bioremediation process. It is believed these improvements are due to improved contact and distribution of liquid, gas and/or solid phases in the process, apparatus and biomass as compared to prior art processes, apparatus and biomass having the same physical and operational parameters i.e. configuration, components, hydraulic pressure, etc., but using solely biologically active bodies without the open body packing elements. A result of the addition of the appropriately distributed open body packing elements is that the process, apparatus and biomass of this invention provide improved bioremediation. In addition, the appropriate distribution of the added open body packing also improves reactor capability to maintain a more steady concentration level of a contaminant in the effluent stream despite a relatively large fluctuation in concentration of the same contaminant in the process feed stream, as compared to known processes, apparatus and biomass that incorporate only the biologically active bodies but lack the open body packing elements. In the reactors of the invention, open body packing elements are distributed in layers that alternate with layers of biologically active bodies to create open spaces in the biomass in the reactor for fluid flow. This improvement in process fluid flow through the reactor results in many advantages over the prior art.

The biologically active bodies have porous supports and these supports are preferably formed of flexible polymeric foam that is compressible (to some extent) under operational pressures used during the conduct of the bioremediation process while permitting fluid to penetrate into and flow through pores of the foam. The apparatus and biomass of this invention also provide for reduced compression of the active bodies as compared to prior art processes, apparatus and biomass as using the same structural and operational parameters but that use active bodies without open body packing elements. The layering of biologically active bodies with open body packing elements promotes rapid mass transfer of oxygen into the liquid phase of the packed bed reactor during the conduct of bioremediation process. The apparatus and biomass of this invention also provide for increased mass transfer as compared to prior art processes, apparatus and biomass that may use the same structural and operational parameters but that do not use open body packing elements in conjunction with the active bodies.

The bioremediation aspect of the present invention will be better understood with reference to the included drawing figures. Of course, other aspects of the invention that relate to other chemical and biological processes will also become apparent to those of skill in the art.

Figure 2:
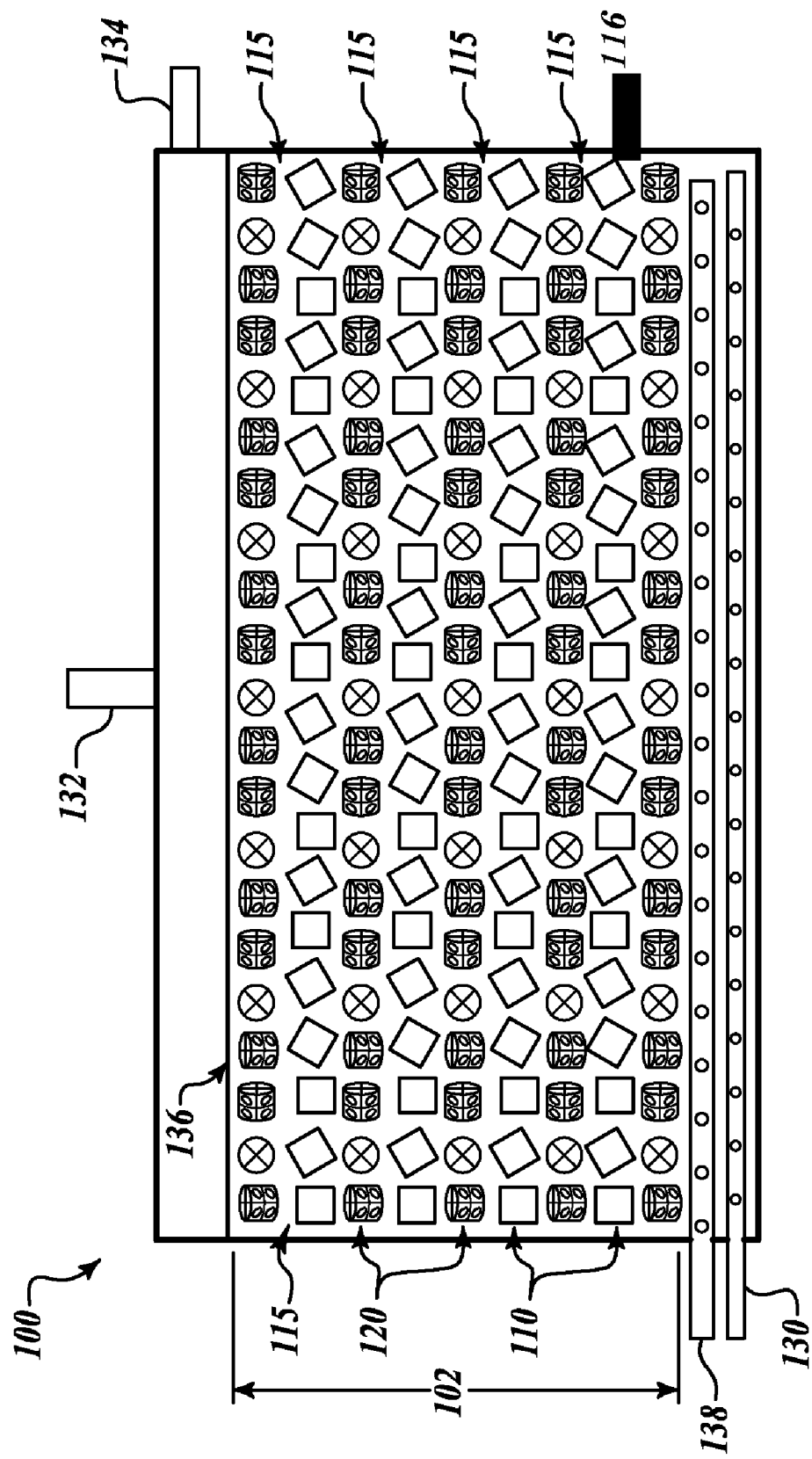
FIG. 2 is a schematic cross sectional view of an embodiment of a rectilinear packed bed reactor in accordance with the invention.

Referring to FIGS. 1 and 2, a reactor 100 intended for use in an embodiment of the process of this invention for biodegradation of materials contained in a feed stream by aerobic or anaerobic microbes. As used herein, the term "biodegradation" includes metabolic decomposition of organic compounds into compounds of lower molecular weight, metabolic conversion of inorganic nitrogen containing species such as ammonia ($NH_3$) and nitrogen oxides (e.g. $NO_3$, $NO_2$ etc.) into nitrogen gas; and de-halogenation through the removal of halogen atoms, such as chlorine, fluorine, bromine, and/or iodine atoms, from halogenated organic compounds.

Reactors 100 in FIGS. 1 and 2 are horizontal and vertical reactors, respectively, of a specific design and configuration. However, in the practice of this invention, design, configuration and materials of construction may vary widely and other reactor designs and configuration may be conveniently used in the practice of this invention provided that all or a portion of the reactor bed 102 is a fixed bed or substantially fixed bed. As used herein a "fixed bed or substantially fixed bed reactor" is a reactor in which the plurality of biologically active particulates are stationary or substantially stationary as the feed flows through the reactor. In addition, the term "packed bed" means a reactor bed that includes packing, of any kind, whether the packing contains (or is intended to contain) biomass or not.

Reactor 100 contains a packed bed 102 that includes biologically active bodies 110, biomass 116, open body packing elements 120. There are some voids or open or substantially open regions 115 in the biomass 116 between the active bodies 110 and the packing elements 120. Process fluid may flow through these open regions 115. Active bodies 110 are restrained from being carried upward, by forces exerted by upward flowing process fluids, by a porous screen or plate 136. Screen 136 has porosity sufficient to allow flow through it of an effective amount of gas or liquid required for the metabolic processes of microorganisms on active bodies 110 during bioremediation. Reactor 100 also includes diffusers 138 for introduction of the gas into reactor 100, and a fluid feed distributor 130.

As shown in the embodiments of FIGS. 1, and 2, the packed beds 102 of reactors 100 have open body packing elements 120 which are layered adjacent to layers of active bodies 110. In general, any of a variety of structures that are capable of providing for open or substantially open regions for fluid flow there through may be used as structure for open body packing 120. Accordingly, open body packing 120 may take a variety of shapes. However, the shapes may also optionally be selected to facilitate the creation of open spaces 115 between the active bodies and the open body packing elements 120 in the biomass 116 to permit fluid flow through also through spaces 115.

In one embodiment, the supports 114 for the biologically active bodies 110 (see FIGS. 1, 2 and 3) are rectilinear porous bodies such as cubes, and the open body packing 120 may then be substantially cylindrical. As depicted in FIG. 4, the Jaeger HiFlow™ packing is an example of an open body packing element 120. In this case, the packing element 120 is in the form of a thin cylindrical sleeve 122 that is pierced by four through bores 126, one in each quarter of the outer surface. In addition, sleeve 122 has a pair of intersecting vertical inner walls (or fins) 124 that provide increased inside surface area to increase the surface area to volume ratio of the packing element 120. The packing elements have a rigid open framework 128 which skeletally define the structures.

While the shape of open body packing element 120 is not critical, and substantially any shape can be used that will create open spaces therein for flow, the embodiments depicted in FIG. 4 are substantially cylindrical.

During reactor operation, fluid feed stream flowing through open regions 115 and through open body packing 120 facilitate contact between the fluid and all or substantially all of the internal and external surfaces of all or substantially all adjacent biologically active bodies 110.

To maximize appropriate contact between the process fluid stream and biomass on active bodies 110, the open body packing 120 should preferably be substantially comprised of passages (voidage or void space) through which process fluid can flow. Typically the passages or void space of the open body packing elements 120 are at least about 40 vol. %, preferably at least about 50 vol. %, more preferably at least about 80 vol. % and most preferably at least about 95 vol. % of the total volume of the packing element 120. Accordingly, the surface area to volume ratio of structures 120 is less than that of biologically active bodies 110.

Figure 3:
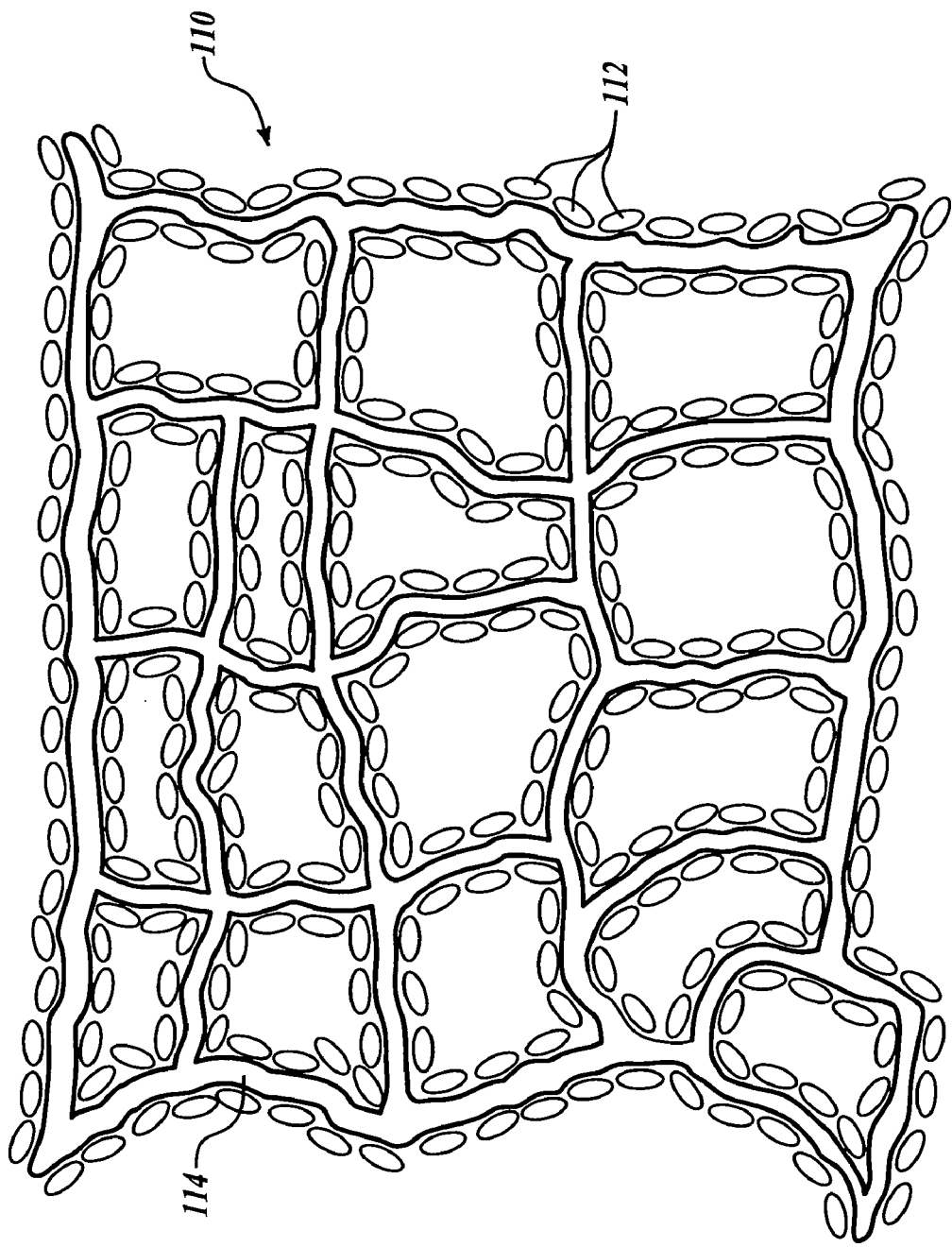
FIG. 3 is a schematic representation of a foam support element in cross section.
Figure 4:
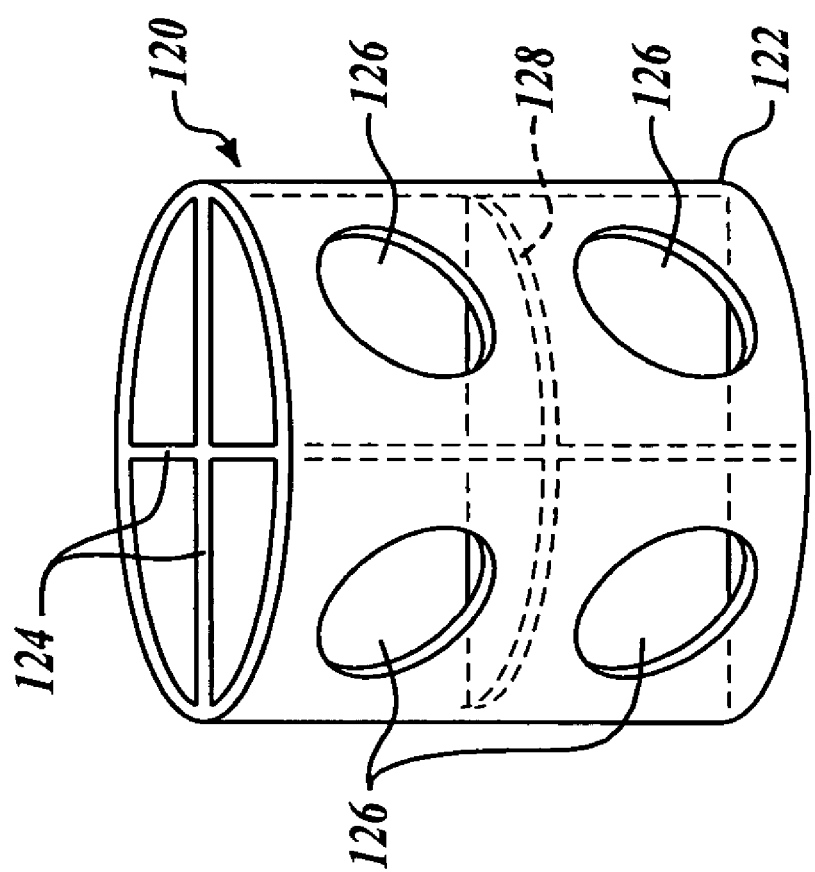
FIG. 4 is an example in perspective view of a prior art open body cylindrical packing element, such as the Jaeger supplied HiFlow™ packing element.

As shown in FIG. 3, biologically active bodies 110 comprise a substrate 114 and one or more types of microorganisms 112, usually aerobic or anaerobic, and preferably aerobic, which are capable of metabolizing at least one of the materials contained in the waste stream on, in or on and in substrate 114. The relative positioning and relative proportions of biologically active bodies 110, the open or substantially open regions 115 in biomass 116, and the open body packing elements 120 are critical to the advantage of this invention. The packed bed component proportions and positioning should be optimized to provide contact between the process fluid feed stream and all or a portion of the external or internal surfaces of the biologically active body 110.

While we do not wish to the bound by any theory, it is believed that the positioning and proportions of packed bed components result in the enhanced gas/liquid/solid mass transfer and distribution and therefore enhances contact between the material to be biodegraded in the process fluid stream and microbes 112 on, in and on and in substrate 114 of body 110. This enhances the effectiveness of the biodegradation process. An advantage of enhanced fluid distribution is that the bioremediation process, apparatus and biomass of this invention are more effective than analogous prior art process, apparatus and biomass in which the reactor lacks the open body packing elements, such as those described in U.S. Pat. Nos. 4,576,718 and 4,983,299, and PCT WO 90/11970. Moreover, data shows that another advantage over these prior art processes, reactors and biomass is believed to result from enhanced distribution is enhanced resistance to reactor "upset," as explained here below.

In general, the present invention provides a significant enhancement of reactor processing capability versus other reactors not having the open body packing elements 120. For example, the relative proportions and relative positioning of bodies 110 and open body packing elements 120 in biomass 116 of a reactor 100 of the invention are such that bulk removal rate of at least one (contaminant) material from the process feed stream at a residence time of about 10 hours, is greater than that of another packed reactor lacking the open body elements 120 but otherwise of the configuration, and components and operated in the same manner as the reactor 100 of this invention, even if the number of active bodies 110 in the other reactor is equal to the sum of the number of packing elements 120 and number of active bodies 110 in the reactor of the invention. The relative positioning and proportions of bodies 110 and open body packing 120 are preferably such that the bulk removal rate of (contaminant) materials by the reactor of this invention is more than about 10%, preferably more than about 20%, more preferably equal to or greater than about 30% and most preferably more than about 50 to about 100% of that of another reactor in which the packed bed is solely active bodies 110 and lacks open body packing elements 120. Bodies 110 and open body packing elements 120 are preferably juxtaposed relative to each other such that at least about 50 area % of internal and external surface of at least about 50% of total number of biologically active bodies 110 is layered adjacent to a layer that includes open body packing elements 120 and so that active bodies 110 are in contact with the process fluid feed stream flowing through packing elements 120. In the more preferred embodiments of the invention, active bodies 110 and open body packing elements 120 are positioned such that at least about 60 area % of internal and external surfaces of at least about 60% of total number of active bodies 110 is layered adjacent to a layer that includes open body packing elements 120 and so that active bodies 110 are in contact with the process fluid feed stream flowing through packing elements 120. In the most preferred embodiments of the invention active bodies 110 and open body packing elements 120 are juxtaposed relative to each other such that at least about 80 area % of internal and external surface of at least about 80% of total number of biologically active bodies 110 is layered adjacent to a layer that includes open body packing elements 120 and so that active bodies 110 are in contact with the process fluid feed stream flowing through packing elements 120.

Biomass 116 comprises an effective amount of open body packing elements 120 dispersed in the biomass. As used herein "an effective amount of open body packing elements 120" is an amount capable of providing any increase in the gas/liquid/solid distribution in biomass 116, and an improvement in bulk removal rate at a residence time of about 10 hours as compared to an analogous biomass of all or substantially all active bodies 110. In general, the amount of open body packing elements 120 can be defined in terms of the percent volume of the biomass composed of region 115. In the preferred embodiments of the invention, the total percent volume of the packed bed 102 volume composed of open body packing elements 120 is from about 30 to about 90 vol. %, the remaining volume percent being all or substantially all biologically active bodies 110. In the particularly preferred embodiments of the invention, the total % volume of reactor bed 102 that is open body packing elements 120 is from about 80 to about 40 vol. %, the remaining volume percent being all or substantially all active bodies 110. In the most preferred embodiments of the invention, the total % volume of reactor packed bed volume 102 that is open body packing elements 120 is from about 50 to about 70 vol. %, the remaining volume percent being predominantly active bodies 110.

The structure and composition of the open body packing elements 120 may vary widely provided that they provide the desired results in enhanced bioremediation, and/or resistance to upset or surges in concentration levels in the influent therein. The only requirement is that the material of the elements 120 is non-reactive and otherwise appropriate for use in a reactor where it is to be used, and is suitable for use in microbial processes, in this case. For example, open body packing elements 120 may be formed from organic materials or inorganic materials. Illustrative of useful inorganic materials for fabrication of open body packing elements are ceramics such as bentonite, kaolinite, kieselguhr, diatomaceous earth, aluminum, silica, zirconia, barium titanate, synthetic carbides, synthetic nitrides and synthetic borides, glasses such as soda-lime-silica glasses, lead glasses, borosilicate glasses, laser glasses, silica glasses, and glass-ceramics and the like. Suitable organic materials for fabrication of packing elements are polymers such as polyamides, polyesters, polyester carbonates, polycarbonates, polyolefins and the like. Preferably, structures 22 are molded of a rigid plastic such as polypropylene or polyethylene.

The shape of packing elements may vary widely; the only requirement is that such shape includes sufficient open space internally or around it so that during reactor operation, the packing provides the predominant passages for facilitating fluid flow through the reactor. Packing elements 120 used in the practice of this invention are in particulate form. As used herein, "in particulate form" merely means that the size of the packing element is less than that of the reactor selected for use such that the reactor may contain a plurality of packing elements. The size and shape of open body packing elements can vary widely in length, thickness, width, diameter or other size measure. For example, the packing may be in particulate form of regular shape such as cubed, rod shaped, rectangular, cylindrical, and hexagonal or the like, or may be of irregular shape. The particulate size (length, thickness, width and diameter or equivalent diameter for irregular shaped structure) may vary widely and is not critical but depends upon the reactor size. Particulate size is preferably from about 0.10 in. to about 12 in. for a 20 ft diameter reactor, and appropriate scale up factors may be used for larger or smaller reactors. More preferred particulate sizes are from about 0.5 in. to about 5 in., and most preferred particulate sizes are from about 0.75 in. to about 3 in. with a particulate size of from about 1.0 in. to about 2.0 in. being the particulate size of choice for 20 ft diameter reactor.

Biologically active bodies 110 used in the practice of this invention are also particulate form. As used herein, "in particulate form" merely means that the size of bodies 110 is less than the size of reactor 100 such that the reactor 100 may contain a plurality of bodies 110. The size and shape of bodies 110 may vary widely in length, thickness, width and diameter. For example, bodies 110 may be in particulate form of regular shape such as cubed, rod shaped, rectangular, cylindrical, hexagonal or the like, or may be or irregular shape. The particulate size (length, thickness, width and diameter for regular shaped bodies 110 and equivalent diameter for irregular shaped bodies 110) may vary widely and is not critical and depends on the reactor size. Particulate size is preferably from about 0.10 in. to about 12 in. for a 20 ft diameter reactor. More preferred particulate sizes are from about 0.5 in. to about 5 in., and most preferred particulate sizes are from about 0.75 in. to about 3 in. with a particulates size of from about 1.0 in. to about 2.0 in. being the particulate size of choice, for a 20 ft diameter reactor.

One critical requirement for bodies 110 is that the surface area to volume ratio (taking into account both internal and external surfaces) is greater than that of open body packing elements 120. The greater the difference in this ratio, the more effective the process. Accordingly, it is recommended that open body packing 120 and active bodies 110 be chosen such that the difference in the surface area to volume ratio is as great as possible, while at the same time retaining the required relative positioning and proportions of bodies 110 and open body packing elements 120 in biomass 116. The ratio of the internal and external surface area to volume of bodies 110 is preferably at least about 20 times greater than that of open packing elements 120, more preferably at least about 10 times greater of than that of packing elements 120 and is most preferably at least about 5 times greater than that of packing elements 120.

Biologically active bodies 110 include a substrate 114, as depicted in FIG. 3, and substrate 114 is preferably porous. This allows some degree of inflow of a process fluid stream into and through bodies 110. In the preferred embodiments of this invention, substrate 114 includes from about 2 to about 60 pores per linear inch ("ppi."). The number of pores per linear inch is more preferably from about 5 to about 30, and most preferably from about 10 to about 20. In the embodiments of choice, the number of pores per linear inch is from about 10 to about 15.

Substrate 114 is preferably resistant to forces that arise in the reactor, such as shear forces and abrasion forces, and preferably has good crush strength. In the preferred embodiments of the invention, substrate 114 is preferably semi-flexible, with a density of under about 2 pounds per cubic foot for optimum economic feasibility. However, higher density substrates, of from about 4 to about 5 pounds per cubic foot or even higher, are usable. It should be realized that substrate density is related to the economics of the invention and not to its performance: the invention may be practiced with a large range of substrate densities, even if certain ranges may present distinct economic advantages.

The amount of substrate 114 included in the biologically active bodies 110 may vary widely. In general, the amount of substrate 114 is from about 50 to about 95 weight percent based on that total weight of biologically active body 110. In the preferred embodiments of the invention, the amount of substrate 114 is from about 60 to about 90 weight percent based on the total weight of active body 110, including its associated biomass. In the particularly preferred embodiments the amount of substrate 114 is from about 70 to about 85 weight percent, on the aforementioned basis.

Substrate 114 is formed from any material capable of forming a biologically active body 110. Useful materials include inorganic materials and organic plastics. Illustrative of useful materials for fabrication of substrates 114 are synthetic and naturally occurring polymeric materials such as polyamides such as poly(hexamethylene adipamide) (nylon 66), poly(4-aminobutyric acid) (nylon 4), poly(6-aminohexanoic acid) (nylon 6), poly(hexamethylene sebacamide) (nylon 6,10) and the like; polyesters such as poly(ethylene terephthalate), poly (butylene terephthalate), poly(1,4-cyclohexane dimethylene terephthalate) and the like; polyolefins such as polyethylene, polypropylene, poly(4-methyl pentene), polystyrene and the like; polyvinyls such as polyvinyl alcohol, poly(vinyl methyl ether), poly(vinyl methyl ketone), poly(vinyl pyrrolidone) and the like; polyacrylics such as polyacrylic acid, polymethacrylic acid, poly(methyl acrylate) poly(methyl methacrylate) poly acrylonitrile, polyacrylamide, poly(methacrylamide) and the like. Other useful polymeric materials for use in the fabrication of the polymeric substrate are polyurethanes such as those derived from reaction of diisocyanates such as toluene diisocyanates, diphenyl methane diisocyanates, hexamethylene 1,6-diisocyanate, dicyclohexylmethane diisocyanate, 1,5-naphalene diisocyanate, p-phenylene diisocyanate, m-phenylene diisocyanate, 2,4-toluene diisocyanate, 4,4' diphenylmethane diisocyanate, 3,3'-dimethyl-4,4' diphenylmethane diisocyanate, 3,3'-dimethyl-4,4' biphenyl diisocyanate, 4,4'-diphenylisopropylidiene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyananodiphenylmethane and the like and diols such as glycerin, trimethylopropane, 1,2,6-hexane triol, methyl glycoside pentaerythriol, sorbital sucrose, ethylene glycol, diethylene glycol, hydroxy terminated polyesters formed by direct esterification of dicarboxylic acid with an excess of a disfunctional alcohol such as poly(tetramethylene adipate), poly(ethylene adipate), poly(1,4-butylene adipate), poly(1,5-pentylene adipate), poly(1,3 butylene adipate), poly(ethylene succinate), poly(2,3-butylene succinate), polyether diols such as those prepared by reaction of a compound having active hydrogens such as di alcohols, poly alcohols, di phenols, polyphenols, aliphatic diamines or polyamines and aromatic diamines or polyamines with alkylene oxides such as styrene oxide, butylene oxide, propylene oxide, epichlorohydrin or mixtures of these alkylene oxides, ethylene diamine, diethylene triamine and 4,4-phenyl-methane diamine.

In the preferred embodiments of this invention substrate 114 is formed of flexible, semi-flexible or rigid polymeric foam. The more preferred polymeric substrate material in the present invention is flexible open-celled foam with a relatively high permeability at least about 60%, preferably at least about 75%, more preferably at least about 85% and most preferably at least about 95%, to the process fluid feed stream. The foam used in the practice of this invention must accommodate process feed flow in the fixed bed configuration. To this end, it is important that the foam has a relatively highly interconnected porosity where the foam voids desirably are at least about 40 volume % and can range up to about 98 volume %.

The foam voids of substrate 114 are preferably on the order of from about 40 volume % to about 98% in volume, more preferably from about 60 volume % to about 96 volume % and most preferably from about 85 volume % to about 95 volume %. "Flexible cellular polymeric materials" are usually compressible. As used herein "flexible cellular polymeric material" means a cellular organic polymeric material which will not rupture when a specimen 200 by 25 by 25 mm is bent around at 25 mm diameter mandrel at a uniform rate of one lap in 5 secs at a temperature between 18 and 29° C. as specified by ASTM Standards D 1565, D 1667, D 3574 and D 3575. Because of their flexibility, substrates 114, when used alone, tend to agglomerate and lose their original form and shape under pressure, which can be generated by the buoyant force when said bodies are immersed in a fluid having a higher density than said bodies, resulting in a decrease in their effective surface to volume ratio and causing a hindrance to the passage of the fluid stream through and around said bodies thereby decreasing the rate of mass transfer and performance. By addition of layers of open body packing elements 120, agglomeration of flexible bodies 110 is greatly reduced. It is theorized without being bound that increased fluid flow through and around bodies 110, and decreased effective buoyant force on the bodies, result in more effective bioremediation and/or enhanced resistance against upset due to surges in material concentration levels in the feed stream, as compared to a process or reactor using only bodies 110 without open body packing elements 120.

In the more preferred embodiments of this invention, substrate 114 is formed from open-celled polyurethanes, such as cross-linked polymeric materials which can be foamed with an appropriate foaming agent such as nitrogen, helium, carbon-dioxide, azodicarbonamide and the like, to form open celled foams having the void characteristics described above. In these preferred embodiments of the invention substrate 114 can be prepared and foamed in the presence of the selected microorganism without adversely affecting same.

In the particularly preferred embodiments of the invention, substrate 114 is formed from cross-linked poly-urethane-hydrogels. Such materials can be obtained from commercial sources or prepared in accordance with known techniques. For example, such materials may be obtained by reacting isocyanate prepolymers with water (in which diamines or polyamines are optionally contained as chain lengthening agents), or as cross-linking agents or by reacting a suitable polyol with a suitable diisocyanate or polycyanate reagent. Suitable polyols include long chain aliphatic diols and polyoxyalkylene ethers. The isocyanate prepolymers have isocyanate end-groups and are prepared by reacting poly oxyalkylene ethers with an excess of diisocyanate or polyisocyanates. Illustrative of useful polyoxyalkylene ethers are those which have a molecular weight of from about 500 to about 10,000, preferably from about 2,000 to about 8,000, which have at least two active hydrogens and which contain at least 30% by weight based on the total weight of the polyethers of oxyethylene groups. Other useful oxyalkylene groups include oxypropylene, oxybutylene and the like. Polyethers of this type are produced by reacting compounds which have reactive hydrogen atoms such as dialcohols, polyalcohols, diphenols, polyphenols, aliphatic diamines, aliphatic polyamines, aromatic diamines, or aromatic polyamines with a suitable alkylene oxide such as ethylene oxide, propylene oxide, butylene oxide, styrene oxide and the like. Suitable diisocyanates include toluene 4,4'-diisocyanate, toluene 2,4-diisocyanate, toluene 2,2-diisocyanate, diphenylmethane 4,4'-diisocyanate, diphenylmethane 2,4'-diisocyanate, diphenylmethane 2,2'-diisocyanate, toluene 2,6-diisocyanate, hexamethylene 1,6-diisocyanate and useful diamines and polyamines include aliphalic, cycloaliphatic and aromatic di- and polyamines such as ethylene diamine, hexamethylene diamine, diethylene triamine, hydrazine, guanidine, carbonate, N,N'-diisopropylhexamethylene diamine, 1,3-bisaminomethylbenzene, N,N'-bis-(2-aminopropyl)-ethylene diamine, N,N'-(2-aminoethyl) ethylene diamine, 4,4'-diaminodiphenyl methan, 4,4'-dimethylamino-3,3'-dimethyldiphenyl methane, 2,4'-diamino-diphenylemthane, 2,4-diaminotoluene, 2,6-diaminotoluene and the like.

Biologically active bodies 110 may include various optional ingredients such as a material having cationic groups. Illustrative of such materials are standard ion exchange resins which have cationic groups or other polymers which have structures containing positively-charged nitrogen atoms such as polyaminocarboxylic acid esters having cationic groups, polyacrylamides having cationic groups, polyethylene imines having cationic groups, copolymers of acrylonitrile, styrene and dimethylaminoethyl methacrylate having cationic groups, and condensation products of diethylene triamine and maleic anhydride having cationic groups, copolymers of isobutylene and maleic anhydride, followed by imidization with specific diamines, having cationic groups. The content of polymers having cationic group in the composition according to the invention may vary widely and is usually from about 0.2 to about 20% by weight based on the total weight of the biologically active particulate, preferably from about 0.5 to about 15% by weight, and most preferably from about 1 to about 10% by weight, based on the total weight of the reaction mixture for the preparation of the composition. Illustrative of other optional components which can be used in the practice of this invention are density-increasing substances such as barite, metal powder, powdered rubber, clay powder, pumice powder, glass powder, powder obtained from the kernels and shells of olives and nuts, and rock-flour; density-reducing substrates such as small polystyrene globules, wood powder, powder from plastic waste, hollow microbeads, and polyethylene foam flakes; coloring agents such as coloring pigments, and dyes; short fibers of an organic or inorganic base such as glass fibers and gel-forming macromolecular substances such as types of cellulose, alginate, starch, and carrageenan.

For example, in one preferred embodiment of this invention, substrate 114 is formed from one or more "hydrophobic polyurethanes", which are absorbent for organic materials such as phenol. As used herein, "hydrophobic polyurethanes" are family of polymers containing repeat urethane groups of the formulae: —N(H)C(O)O— or —N(H)C(NH)O—, preferably of the formula: —N(H)C(O)O—.

Hydrophobic polyurethanes are those which cannot be wetted by water. That is, a droplet of water on the surface of the polyurethane has an angle of contact of greater than 0.0 degrees and preferably greater than 90 degrees, as measured by a goniometer. In the preferred embodiments of the invention, hydrophobic polyurethanes are those in which the molar ratio of carbon and hydrogen atoms to oxygen and nitrogen atoms in the polymeric backbone is greater than 1.4. The upper level of hydrophobicity of the polyurethane is not critical and in general hydrophobic polyurethanes having higher hydrophobicity are preferred. In the preferred embodiments of this, the hydrophobic polyurethanes are selected such that the molar ratio of carbon and hydrogen atoms to oxygen and nitrogen atoms in equal to or greater than about 2.0, and in the more preferred embodiments of this invention the ratio of carbon and hydrogen atoms to oxygen and nitrogen atoms in equal to or greater than about 2.5. Amongst the more preferred embodiments of this invention, most preferred are those embodiments in which the molar ratio of carbon and hydrogen atoms to oxygen and nitrogen atoms is equal to or greater than about 3.0.

Illustrative of useful hydrophobic polyurethane are those described above in which molar quantities of polyisocyanate and polyol reactants have bee adjusted to provide the desired hydrophobicity. The adsorption and/or absorption of materials in the fluid feed stream, such as substituted and unsubstituted phenol, onto and into the polyurethane foam can be affected by both the type of polyol used as well as the portion of cross-linked isocyanate compounds present in the foam. In the preferred embodiments of the invention, aromatic isocyanates and/or polyols having a larger ratio of carbon and hydrogen to oxygen such as polyols such as those polyols which contain increased carbon atoms such as poly(propylene ether) glycol and other polyols having pendant aliphatic groups. In the most preferred embodiments, it is preferred to increase the amount of aromatic groups, specifically aromatic isocyanate compounds, in the hydrophobic polyurethane foam in order to enhance the hydrophobic characteristic of the polymer. Preferably, the hydrophobic moieties derived from one or more types of polyurethane contains more than about 15% by weight of an aromatic isocyanate and less than about 85% by weight of a moiety derived from one or more types of a poly(alkylene ether) glycol wherein at least about 40% by weight of the diol derived moieties are derived from such glycols where the alkylene repeat units include more than three carbon atoms especially poly(propylene oxide). Among these preferred embodiments of the invention, more preferred are those embodiments in which the hydrophobic polymer has at least 50% by weight of poly (alkylene ether) glycol and more than about 20% by weight of aromatic isocyanate. In particular preferred embodiments, the polyol content of hydrophobic polyurethane is at least 80% by weight of which less than about 60% by weight is polyethylene ether glycol, and less than about 25% by weight of aromatic isocyanate. In the more particularly preferred embodiments of invention, the polyol content is greater than about 70% by weight polyethylene oxide and less than about 30% by weight of aromatic isocyanate.

Microorganisms 112 used in the practice of this invention are anaerobic or aerobic microorganisms selected to degrade target materials in the fluid stream in ways well known in the art. The microorganisms can be employed as a pure strain or as a consortium of microorganisms. Although anaerobic microorganisms often degrade pollutant materials at a slower rate than aerobic microorganism, an anaerobic process may be required to degrade a pollutant or an intermediate product of an aerobic process to a nontoxic level or to a non pollutant material. Useful microorganisms 112 may vary widely and may be naturally occurring microorganisms 112 or may be genetically engineered microorganisms 112. The only requirement is that microorganisms 112 are capable of metabolizing the target pollutant(s) to the required effluent levels over the required period of time. In the preferred embodiments of the invention, micro-organisms 112 are obtained from the pollutant-containing waste stream or from soil which has been in contact with the waste stream.

In the process, a fluids stream, as for example a aqueous feed fluid stream, containing one or more biodegradable materials is introduced into reactor 100 via inlet distributor 130, passes through reactor 100 and exits the reactor via exit 134 at a rate sufficient to reduce the concentration of at least one of the materials in the effluent stream to the desired levels. The process of this invention can be conducted under aerobic or anaerobic conditions. In the preferred embodiments of the invention where aerobic microbes are employed, the process is carried out under aerobic conditions in which the process is carried out in the presence of a gas comprising an effective amount of oxygen. In the preferred embodiment, it is important that reactor 100 be oxygenated to provide the necessary amount of oxygen for proper microbial metabolism and pollutant degradation. The amount of oxygen required in any situation will vary widely and will depend to a significant extent on the requirements of the particular microorganism(s) employed in the process and other factors known to those of skill in the art. In general, the amount of oxygen distributed in the process feed stream is at least about 2 mg of oxygen per liter of aqueous feed. In the preferred embodiments of the invention, the amount of oxygen is from about 5 mg per liter of feed to about 10 mg per liter of feed and in the most preferred embodiments of the invention, the amount of the oxygen is from about 6 mg/liter of feed to about 8 mg/liter of feed. In the preferred embodiments of this invention, the gas is distributed uniformly or substantially uniformly throughout all or a portion of the biologically active biomass. The manner in which the gas is introduced into reactor 100 may vary widely. The gas may be introduced into reactor 100 employing conventional methods. For example, in the vertical or up-flow reactor 100 of FIG. 2, the gas is introduced into reactor 100 at the bottom of the reactor 100 through use of diffuser 138 which introduces the gas in the form of small diameter gas bubbles which exit the bioreactor through air exhaust 132. Supplemental gas can be introduced, if required, at various points along the vertical length of reactor 100 (not depicted in the drawing). In the embodiment of the invention of FIG. 1 in which reactor 100 is a horizontal reactor, the gas can be introduced along the horizontal length of reactor 100 at various points to achieve a substantially uniform distribution of the gas in the feed stream in reactor 100. In this embodiment, the up-flow of the gas is orthogonal or substantially orthogonal to the direction of the flow of the aqueous feed stream from inlet diffuser 130 to side outlet 134. In the most preferred embodiments of the invention, reactor 100 is in a horizontal configuration in which the gas is distributed uniformly or substantially uniformly throughout all or substantially of reactor 100. In these most preferred embodiments, the gas is introduced into reactor 100 along the horizontal length of reactor 100 as depicted in FIG. 1. In this mode, a more uniform distribution of the gas in the feed stream is achieved.

Process temperatures may vary widely and will depend on the particular microorganisms chosen for use. In general, the process is carried out at a temperature sufficiently high so as to not unduly interfere with the metabolism of the microorganism and sufficiently low as to not kill the microorganism. Process temperatures are usually from about 5° C. to about 65° C. Process temperatures are preferably in the range of from about 15° C. to about 65° C., more preferably in the range of from about 20° C. to about 40° C. and most preferably in the range of from about 25° C. to about 35° C.

The fluid stream is treated in the process of this reactor for a time sufficient to reduce concentration levels of at least one of the material in the effluent stream to the desired extent. In general, with fluid feed streams in which the concentration levels of at least one material is equal to or less than about 12,000 (ppm) (preferably equal to or less than about 6,000 ppm, more preferably equal to or less than about 3,000 ppm, more preferably equal to or less than about 2,000 ppm) a residence time equal to or less than about 200 hours, preferably equal to or less than about 100 hours, more preferably equal to or less than about 20 hours, and most preferably equal to or less than about 10 hours, suffices to reduce a concentration for at least one pollutant in the effluent stream to equal to or less than about 100 parts per million (ppm), preferably equal to or less than about 10 ppm, more preferably equal to or less than about 1 ppm, most preferably equal to or less than about 0.1 ppm. An effluent concentration of that meets applicable federal or state regulations or that is equal to or less than about 0.02 ppm, is the concentration of choice. The particular residence time depends upon a variety of process factors, including the amount and type of organic materials in the feedstock, operating temperature, the presence of other materials in the feedstock, the density of microorganisms in the reactor, among others.

Embodiments of the process of this invention have improved resistance to "upset". "Upset" is a surge in concentration level, usually of a contaminant being removed in the reactor. Typically such surges in concentration carry through the reactor and are measured in a corresponding surge in contaminant concentration in reactor treated effluent. When such surges or upset occurs and corresponding variations in concentration levels of the material in the effluent stream are minimal or are damped, the reactor system is said to have resistance to upsets. In embodiments of the reactors of the invention there is resistance to upsets. Thus, when the concentration of a contaminant or pollutant in the influent stream surges by a certain increment, the concentration of the pollutant in the effluent stream typically increases by an amount less than or equal to about 25% of the increment in the influent stream, for a period of one hydraulic residence time (HRT). More preferably, the increment in the effluent is by an amount less than or equal to about 10% of the concentration increase in the influent stream, within about one HRT or less. Most preferably the effluent concentration increases by an amount less than or equal to about 1% of the influent concentration increase, within about one HRT or less.

The fluid streams which may be treated in the process of this invention may vary widely. For example, such streams may be gaseous streams containing one or more materials or may be liquid streams. In the preferred embodiments of this invention the fluid stream or aqueous streams containing one or more materials dissolved or suspended therein. The pollutants contained in such streams may vary widely. The only requirement is that at least one of the materials can be degraded or metabolized by an aerobic or anaerobic microorganism. For example, the materials may be inorganic nitrogen compounds such as ammonia and nitrates. The materials may also be organic materials. Illustrative of such organic pollutants are phenolic materials such as phenol, the cresols, resorcinols, catechol, halogenated phenols as for example, 2-chlorophenol, 3-chlorophenol, 4-chlorophenol, 2,4-dichlorophenol, pentachlorophenol, nitrophenols as 2-nitrophenol and 4-nitrophenol and 2,4-dimethylphenol. Another important class of organic pollutants consists of aromatic hydrocarbons, such as benzene, toluene, xylenes, ethylbenzene, and so forth. Polynuclear aromatic hydrocarbons are an important subclass as represented by naphthalene, anthracene, chrysene, acenaphthylene, acenaphthene, phenanthrene, fluorene, fluoranthene, naphthacene, and pyrene. Still other materials are halogenated alkanes such as trichloroethane and the like.

In the preferred embodiments of this invention the materials are those which are common in waste streams from industrial manufacturing facilities. For example, various substituted and unsubstituted phenols such as phenol, chlorophenols and nitro-phenols, and aromatics such as benzene are preferred pollutants for treatment in the process of this invention, and substituted and unsubstituted phenols, especially phenol, are the most preferred pollutants. Phenol is found in waste streams of phenol manufacturers, of phenol users as phenol resin producers, of coal tar processing facilities, of wood pulping plants and other facilities practicing delignification. This is not to say that the process can or must be practiced only on such streams. The process which is the invention herein may be practiced on any feed containing levels of one or more materials which are to be reduced.

The initial concentration of materials contained in the aqueous waste stream used in the process of this invention may vary widely. One of the advantages of this invention relative to prior art bioremediation processes is that fluid streams containing relatively high amounts of materials to be removed or reduced in concentration can be treated. The concentration of materials to be removed or reduced in concentration in process streams treatable in the process of this invention are "biologically treatable levels". As used herein, "biologically treatable levels" are materials to be removed or reduced in concentration which do not inhibit or excessively inhibit the metabolism of the pollutants by the microorganism. Effluent streams from industrial processes such as phenol manufacturing plants and coal tar processing plants may have materials to be removed or reduced in concentration levels in excess of 20,000 ppm which may interfere with the process. It is preferred to reduce these levels to biologically treatable levels through use of conventional procedures such as solvent extraction, steam distillation and the like. In general, the concentration of materials to be removed or reduced in concentration in the fluid streams (preferably aqueous streams) is equal to or less than about 12,000 ppm. Obviously, the lower concentration is not critical and does not represent a limitation on the process. In the preferred embodiments of this invention, the concentration of materials to be removed or reduced in concentration is equal to or less than about 6,000 ppm, and in the particularly preferred embodiments of the invention the concentration of materials to be removed or reduced in concentration is equal to or less than about 3000 ppm. Amongst these particularly preferred embodiments of the invention, most preferred are those in which the concentration of materials to be removed or reduced in concentration is equal to or less than about 2000 ppm with a material concentration of equal to or less than about 1000 ppm being the concentration level of choice.

The pH of the pollutant-containing feed may need to be adjusted for optimum biodegradation. In general, the pH is within the pH range allowing metabolism of the target pollutant(s). In the preferred embodiments of the invention, the pH of the feed is from about 6 to about 9, and in the most preferred embodiment of the invention, the pH of the feed is from about 6.5 to about 7.5.

Nutrients may need to be provided. Such materials may be added through use of known additives such as fish meal peptine, soybean flour, peanut oil, cotton seed oil, and usually salts capable of providing phosphate, sodium, potassium, ammonium, calcium, sulfate, chloride, bromide, nitrate, carbonate or like ions. Usually sufficient amounts often are present in the aqueous feed to satisfy minimum requirements of the microorganism.

The aqueous feed stream is introduced into reactor 100 employing conventional means and is passed through the reactor employing an "effective hydraulic retention time". As used herein, an "effective hydraulic retention time" is a time which is sufficient for the process to reduce the concentration of pollutant in the effluent stream to the desired levels. Hydraulic retention times may vary widely and in general depend on such factors as the concentration pollutants in the aqueous feed stream, desired maximum concentration of pollutants in the aqueous effluent stream, the microorganisms contained in the biomass, the pollutant, and the like. An advantage of the process of this invention is that reductions in pollutant concentration can be obtained with relatively short hydraulic retention times. In the preferred embodiments of this invention, hydraulic retention times are equal to or less than about 72 hrs, and in the particularly preferred embodiments of the invention such times are from about 1 to about 48 hrs. Amongst these particularly preferred embodiments of the invention, most preferred are those embodiments in which the hydraulic retention time is from about 2 to about 24 hrs.

The effluent stream has reduced materials concentration and contains no or substantially no sludge. Such effluent stream can be disposed in compliance with Government regulations. Alternatively, the effluent stream can be treated to remove any sludge that may be present, as for example, through use of a clarifier and may be recycled for internal use in the process that produced the effluent stream or for other purposes as for example in cooling towers, boilers for steam generation, heat exchangers, scrubbers, reactors and the like.

In one embodiment, the invention provides a packed bed reactor having a series of alternating layers of packing. The alternating layers of packing include a first packing layer of open body packing elements; and a second packing layer of porous support elements comprising pores in the size range from about 15 to about 20 ppi. Optionally, the open body packing of the first packing layer is cylindrical packing. Optionally, the first packing layer has a void space in the range from about 70 to about 95%. Further optionally, the first layer is a substantially monolayer of open body packing elements. Otherwise, the first layer is up to about 10 packing elements deep. Optionally, the porous support elements of the second layer are of foam having a surface area to volume ratio of about 35 to about 210 $ft^2/ft^3$. Optionally, the foam has a void space of from about 15 to about 25%. Optionally, the porous support elements of the second layer are of hydrophobic foam. Optionally, the porous support elements of the second layer are of polyurethane foam. Further optionally, the porous support elements of the second layer have a surface area to volume ratio of about 5 to about 20 times greater than a surface area to volume ratio of the open body packing elements. Optionally, the second layer has a depth of up to about 10 layers of square porous support elements.

In another embodiment, the invention provides a packed bed reactor that has a series of alternating layers of packing. The alternating layers of packing include a first packing layer of open body packing elements that are randomly packed in a layer up to about 10 packing elements deep; and a second packing layer of porous support elements of hydrophobic foam that has pores in the size range from about 15 to about 20 ppi. The second layer is randomly packed up to about 10 porous support elements deep. Further, the packing elements of the first layer and the porous support elements of the second layer are selected by shape to maintain a reactor bed void space within the range from about 50 to about 65%. Optionally, the first packing layer open body elements include plastic cylinder shapes. Optionally, the first packing layer has a void space in the range from about 70 to about 95%. Optionally, the porous support elements of the second layer are of foam that has a surface area to volume ratio of about 35 to about 210 $ft^2/ft^3$. Optionally, the porous support elements of the second layer are of foam that has a void space of from about 15 to about 25%. Optionally, the porous support elements of the second layer are of polyurethane foam. Optionally, the porous support elements of the second layer have a surface area to volume ratio of about 5 to about 20 times greater than a surface area to volume ratio of the open body packing elements.

In yet another embodiment, the invention provides a packed bed reactor that has a series of alternating layers of packing. The alternating layers of packing include a first packing layer comprising open body packing elements that are randomly packed in a layer up to about 10 packing elements deep; and a second packing layer of porous support elements of hydrophobic foam. The support elements have pores in the size range from about 15 to about 20 ppi, and are randomly packed up to about 10 porous support elements deep. In addition, the packing elements of the first layer are of substantially cylindrical shapes and the porous support elements of the second layer are of substantially rectilinear shapes. Optionally, the first packing layer has a void space in the range from about 70 to about 95% and the second packing layer has a void space of from about 15 to about 25%.

The following examples are merely illustrative and representative of our invention which is of considerably larger scope. These examples should not be considered limiting in any way.

EXAMPLES

A series of experiments were carried out to evaluate the effect of the orientation of open body spacers with the porous biomass supports, i.e. polyurethane foam.

Example I

Rigid open cylinders (plastic) were obtained from Jaeger Products, Inc., under a trade designation of HiFlow. These open cylinders were used as open body packing elements in biodegradation experiments. The biologically active bodies were of hydrophobic polyurethane foam (PUF) obtained from Foamex, Inc., under a trade designation SIF II. This foam had a polyol content of 75% by weight (approximately 40% by weight ethylene oxide and 60% by weight propylene oxide) and a toluene diisocyanate content of approximately 25 to 35% by weight of reactants. The foam had 15-20 pores per inch, and pores were of varying sizes.

Figure 5:
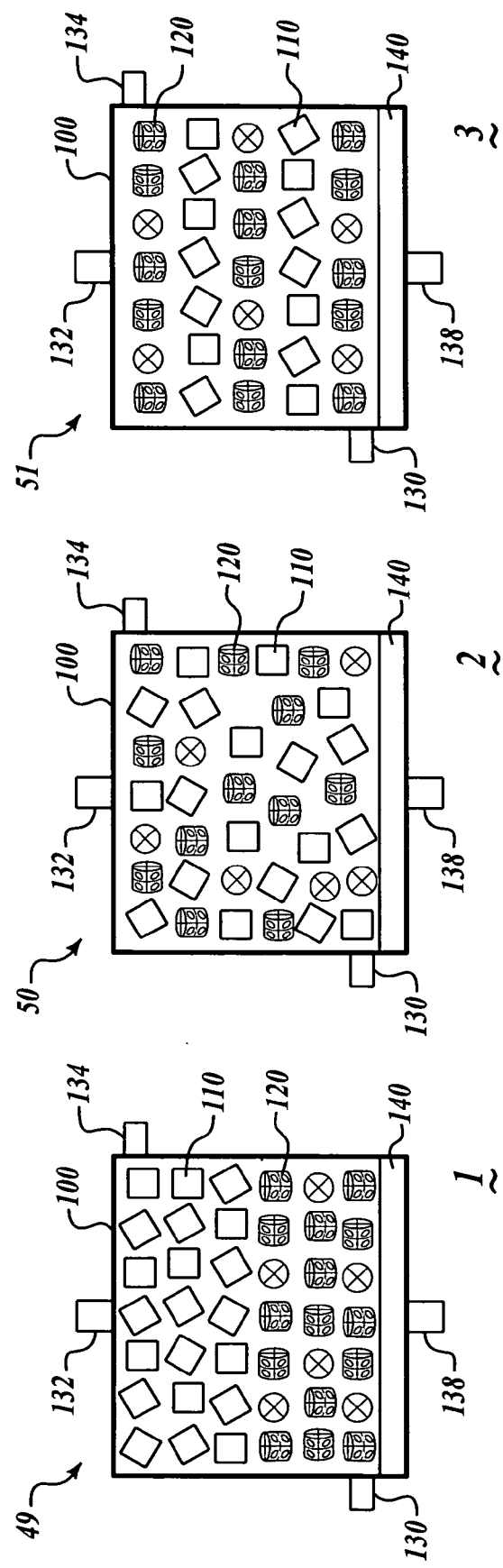
FIG. 5 is a schematic cross sectional representation of the reactors used in Example I.

FIG. 5 illustrates three reactor configurations that were used. PUF porous biomass supports 110 and HiFlow open body packing elements 120 were mixed together in different proportions in order to achieve a certain amount of openness or void space in each bioreactor system. Each bioreactor was of the same volume (1 liter) and each reactor had the same quantity of open body packing elements 120 and porous biomass support structures for the biologically active bodies 110.

Bioreactor 1 (49) consisted to two sections. The bottom half was packed with open packing elements, 0.5 inch HiFlow cylinders, and the top half was packed with 0.5 inch polyurethane cubes as active biomass supports.

Bioreactor 2 (50) consisted of randomly mixed porous biomass supports 110 and the open body packing 120 evenly distributed through the bioreactor.

Bioreactor 3 (51) had alternating, single layers of open body packing 120 and single layers of porous biomass supports 110.

These three bioreactors were charged with the same model wastewater feed that consisted of the following components and concentrations; sodium n-cocyl-n-methyltaurate, 100 mg/L; Igepal CO-630 (nonylphenol ethylene oxide), 100 mg/L; urea, 1000 mg/L; creatinine, 200 mg/L; caprolactam, 20 mg/L; ethanol, 50 mg/L; benzyl alcohol, 20 mg/L, and sodium dihydrogen phosphate, 25 mg/L.

Reactors were operated in a co-current upward flow mode, i.e., both air and waste water flowing from the bottom to the top of the reactor from respective inlets (138 gas, 130 liquid). Compressed air (40 psig) was used to aerate the reactors through a sintered glass diffuser 140 located at the bottom of each reactor 100. A gas regulator was used to regulate the aeration through the diffusers 140 at a level between 8 l/min and 13 l/min. The same amount of air was supplied to each reactor. Rate of aeration was determined on the basis of stoichiometric requirement for complete Chemical Oxygen Demand (COD) degradation. A transfer efficiency (from air to water) of 8% was assumed. Waste water was pumped to the bottom of each reactor with a Masterflex peristaltic pump. The flow of the wastewater was regulated by the pump speed to operate the three bioreactors were operated at hydraulic residence times of 48 hours, 24 hours, 18 hours and 12 hours each for a period of one week at each hydraulic residence time. The amount of COD and urea removed from the influent wastewater was measured in the effluent from the bioreactor 134.

Table I summarizes the removal of COD and urea from this wastewater using the three bioreactor systems

TABLE I

| Hydraulic Retention Time | COD Reduction (%) | | | Urea Reduction (%) | | |
|---|---|---|---|---|---|---|
| | Bioreactor 1 | Bioreactor 2 | Bioreactor 3 | Bioreactor 1 | Bioreactor 2 | Bioreactor 3 |
| (hours) | (49) | (50) | (51) | (49) | (50) | (51) |
| 48 | 95 | 97 | 99 | >99 | >99 | >99 |
| 24 | 91 | 95 | 98 | 97 | >99 | >99 |
| 18 | 85 | 89 | 92 | 91 | 98 | >99 |
| 12 | 65 | 70 | 89 | 91 | 95 | >99 |

All the bioreactors were of the same size and had the same quantity of open body packing elements and porous polyurethane foam biomass supports present in each bioreactor. The only difference between the bioreactors was the distribution of the packing structures within the bioreactors. Bioreactor 1 (49) had the open body packing elements spacers and the porous biomass supports separated in two distinct sections. This configuration of packing structures had the lowest COD and urea reduction. Bioreactor 2 (50) had the open body packing elements and the porous biomass supports evenly distributed throughout the bioreactor. This configuration showed better performance for COD and urea reduction than Bioreactor 1 (49). It is theorized that this was due to better distribution of the air and water in the bioreactor. Bioreactor 3 (51) had the open body packing elements and the porous biomass supports in alternating mono layers and this bioreactor gave the best performance for both COD and urea reduction.

The difference in removal of COD and urea between the bioreactors was more pronounced at the lower hydraulic residence times (i.e. faster flow rates) than at the longer hydraulic residence times (i.e. slower flow rates). It is desirable to use lower hydraulic residence times in bioreactors to treat wastewaters to conduct the treatment as economically as possible. The advantage of using the packing configuration of bioreactor 3, which is a reactor in accordance with an embodiment of the invention, is more pronounced under these conditions, and confirms the superiority of the reactor bed packing scheme of the invention.

Example II

Another set of waste water treatment bioremediation studies were performed to compare the bulk removal efficiency of a randomly dispersed system of open body packing elements and porous biomass supports in a control with a reactor bed according to an embodiment of the invention that has alternating layers of the same supports and packing elements.

Figure 6:
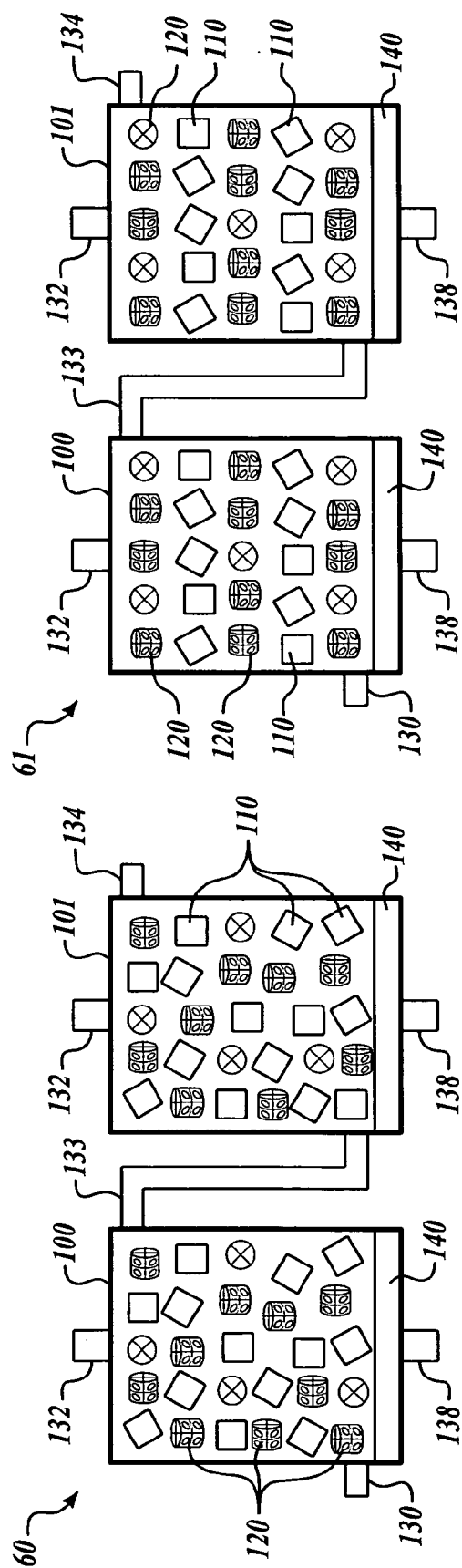
FIG. 6 is a schematic cross sectional representation of the reactors used in Example II.

As shown in FIG. 6, four reactors were used, arranged in pairs. Each pair 60, 61 comprised two reactors 100, 101 linked in series so that effluent from the first reactor 100 was the feed stream to the next reactor 101. Using the procedure of Example I, the Total Organic Carbon (TOC) removal efficiencies for each of the systems were determined. The control pair of reactors, two 1-liter reactors 100, 101 linked in series, was filled with 0.5 inch HiFlow packing 120 and 0.5 inch SIF II foam blocks 110 randomly dispersed, while the other set 61 was filled with the packing arranged in alternative layers of HiFlow 120 and PUF blocks 110 (61).

For each reactor pair, reactors 100, 101 were operated in a cocurrent upward process fluid flow mode. Process fluid to be treated entering reactor 100 at inlet and exiting into line 133 that feeds into the bottom end of reactor 101. The process fluid flowed upward in reactor 101 to exit at exit port 134. Compressed air (40 psig) was used to aerate the reactors 100, 101 through a sintered glass diffuser located at the bottom of each reactor. A gas regulator was used to regulate the aeration through the diffusers at a level between 8 l/min and 13 l/min. The same amount of air was supplied to each pair of reactors.

Waste water to be treated was pumped to the bottom of the reactor 100 for each system 60, 61 with a Masterflex peristaltic pump. The flow of the wastewater was regulated by the pump speed. Each bioreactor pair 60, 61 was operated at hydraulic residence times of 10 hours for a period of one week. The amount of TOC removed from the influent wastewater was measured in the effluent from the bioreactor at exit port 134.

Table II Summary of the Removal of TOC from Wastewater Using Two Bioreactor Systems.

TABLE II

| Bioreactor | Effluent TOC (mg/L) | Standard Deviation |
|---|---|---|
| Disperesed Packing (60) | 35 | 25 |
| Layered Packing (61) | 15 | 12 |

The layered packing bioreactor system (61), in accordance with an embodiment of the invention, had an effluent TOC significantly lower and with less variation than the bioreactor with the dispersed packing.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A packed bed reactor comprising:
a series of alternating layers of packing, the alternating layers of packing comprising:
a first packing layer comprising open body packing elements; and
a second packing layer comprising microorganisms supported by porous support elements comprising pores in the size range from about 15 to about 20 ppi, wherein a surface area-to-volume ratio of the porous support elements is greater than a surface area-to-volume ratio of the open body packing elements.

2. The reactor of claim 1, wherein the open body packing of the first packing layer comprises cylindrical packing.

3. The reactor of claim 1, wherein the first packing layer has a void space in the range from about 70 to about 95%.

4. The reactor of claim 1, wherein the first layer comprises substantially a monolayer of open body packing elements.

5. The reactor of claim 1, wherein the first layer comprises a layer up to about 10 packing elements deep.

6. The reactor of claim 1, wherein the porous support elements of the second layer comprises a foam having a surface area to volume ratio of about 35 to about 210 ft$^2$/ft$^3$.

7. The reactor of claim 1, wherein the porous support elements of the second layer comprises foam having a void space of from about 15 to about 25%.

8. The reactor of claim 1, wherein the porous support elements of the second layer comprise hydrophobic foam porous support elements.

9. The reactor of claim 1, wherein the porous support elements of the second layer comprise polyurethane foam porous support elements.

10. The reactor of claim 1, wherein the porous support elements of the second layer have a surface area to volume ratio of about 5 to about 20 times greater than a surface area to volume ratio of the open body packing elements.

11. The reactor of claim 10, wherein the second layer comprises up to about 10 layers of square porous support elements.

12. A packed bed reactor comprising:
a series of alternating layers of packing, the alternating layers of packing comprising:
a first packing layer comprising open body packing elements, the elements randomly packed in a layer up to about 10 packing elements deep; and
a second packing layer comprising microorganisms supported by porous support elements comprising hydrophobic foam comprising pores in the size range from about 15 to about 20 ppi, the porous support elements randomly packed up to about 10 porous support elements deep;
wherein the packing elements of the first layer and the porous support elements of the second layer are selected by shape to maintain a reactor bed void space within the range from about 50 to about 65%, and wherein a surface area-to-volume ratio of the porous support elements is greater than a surface area-to-volume ratio of the open body packing elements.

13. The reactor of claim 12, wherein the first packing layer open body elements comprises plastic cylinder shapes.

14. The reactor of claim 12, wherein the first packing layer has a void space in the range from about 70 to about 95%.

15. The reactor of claim 12, wherein the porous support elements of the second layer comprises a foam having a surface area to volume ratio of about 35 to about 210 $ft^2/ft^3$.

16. The reactor of claim 12, wherein the porous support elements of the second layer comprise foam having a void space of from about 15 to about 25%.

17. The reactor of claim 12, wherein the porous support elements of the second layer comprise polyurethane foam.

18. The reactor of claim 13, wherein the porous support elements of the second layer have a surface area to volume ratio of about 5 to about 20 times greater than a surface area to volume ratio of the open body packing elements.

19. A packed bed reactor comprising:
- a series of alternating layers of packing, the alternating layers of packing comprising:
    - a first packing layer comprising open body packing elements, the open body packing elements randomly packed in a layer up to about 10 packing elements deep; and
    - a second packing layer comprising microorganisms supported by porous support elements comprising hydrophobic foam comprising pores in the size range from about 15 to about 20 ppi, and the porous support elements randomly packed up to about 10 porous support elements deep;
- wherein the packing elements of the first layer comprise substantially cylindrical shapes and the porous support elements of the second layer comprise substantially rectilinear shapes and wherein a surface area-to-volume ratio of the porous support elements is greater than a surface area-to-volume ratio of the open body packing elements.

20. The reactor of claim 19, wherein the first packing layer has a void space in the range from about 70 to about 95% and the second packing layer has a void space of from about 15 to about 25%.

* * * * *